United States Patent
Nishira et al.

(10) Patent No.: US 6,597,981 B2
(45) Date of Patent: Jul. 22, 2003

(54) APPARATUS AND METHOD FOR CONTROLLING VEHICULAR VELOCITY OF HOST VEHICLE TO FOLLOW PRECEDING VEHICLE RUNNING AHEAD OF HOST VEHICLE

(75) Inventors: Hikaru Nishira, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/983,283

(22) Filed: Oct. 23, 2001

(65) Prior Publication Data

US 2002/0069010 A1 Jun. 6, 2002

(30) Foreign Application Priority Data

Nov. 2, 2000 (JP) ........................................ 2000-335653

(51) Int. Cl.[7] .............................................. B60K 31/00
(52) U.S. Cl. .............................. 701/96; 701/93; 701/94; 180/170; 340/903
(58) Field of Search .............................. 701/93, 94, 96; 180/170, 167, 169, 176, 179; 340/903

(56) References Cited

U.S. PATENT DOCUMENTS

| | | | | |
|---|---|---|---|---|
| 4,622,636 A | * | 11/1986 | Tachibana | 701/96 |
| 5,197,562 A | * | 3/1993 | Kakinami et al. | 180/169 |
| 5,477,457 A | * | 12/1995 | Okada | 701/37 |
| 5,495,251 A | * | 2/1996 | Gilling et al. | 342/70 |
| 5,659,304 A | * | 8/1997 | Chakraborty | 340/903 |
| 5,695,020 A | * | 12/1997 | Nishimura | 180/169 |
| 5,832,400 A | * | 11/1998 | Takahashi et al. | 701/53 |
| 5,839,534 A | * | 11/1998 | Chakraborty et al. | 180/169 |
| 5,901,806 A | * | 5/1999 | Takahashi | 180/170 |
| 5,902,345 A | * | 5/1999 | Minowa et al. | 701/96 |
| 6,044,321 A | * | 3/2000 | Nakamura et al. | 701/96 |

FOREIGN PATENT DOCUMENTS

JP       11-91396       4/1999

* cited by examiner

*Primary Examiner*—Michael J. Zanelli
*Assistant Examiner*—Eric Gibson
(74) *Attorney, Agent, or Firm*—Foley & Lardner

(57) ABSTRACT

In method and apparatus for controlling a vehicular velocity of a host vehicle to follow a preceding vehicle which is running ahead of the host vehicle, a control target is switched between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of a detection of a variation of a gradient of a road segment which is forward of the vehicle and on which the host vehicle is to run.

23 Claims, 9 Drawing Sheets

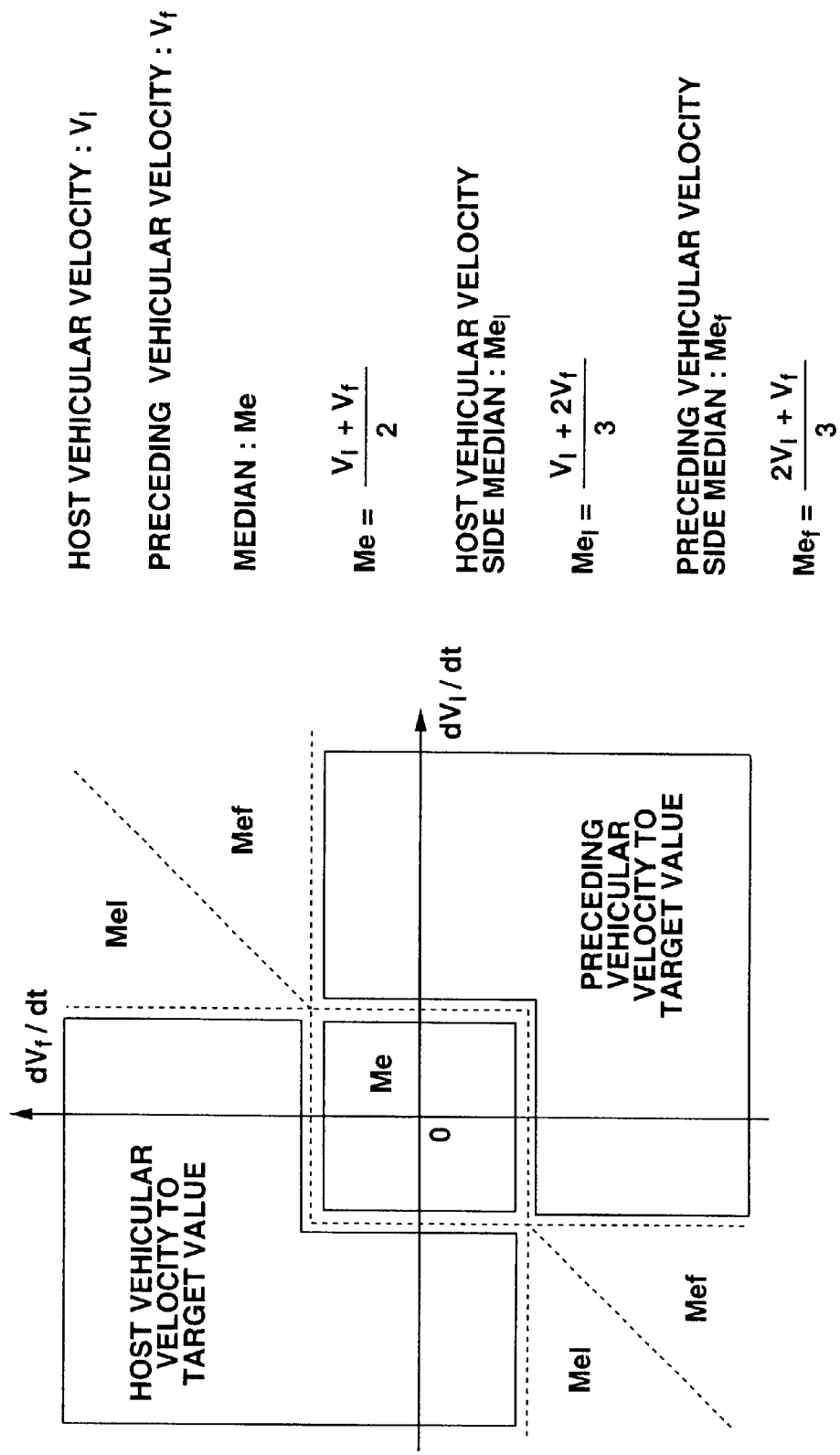

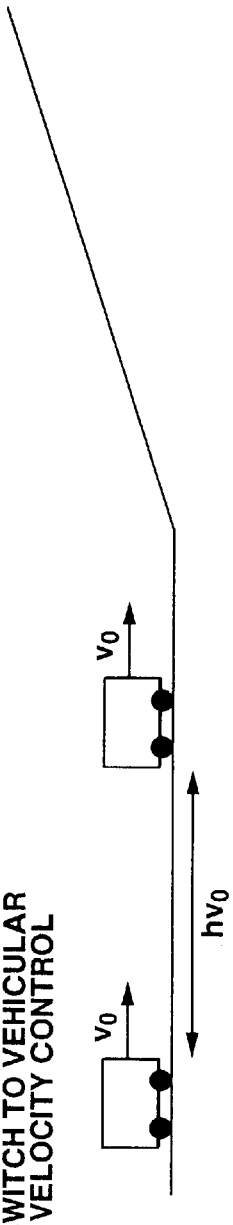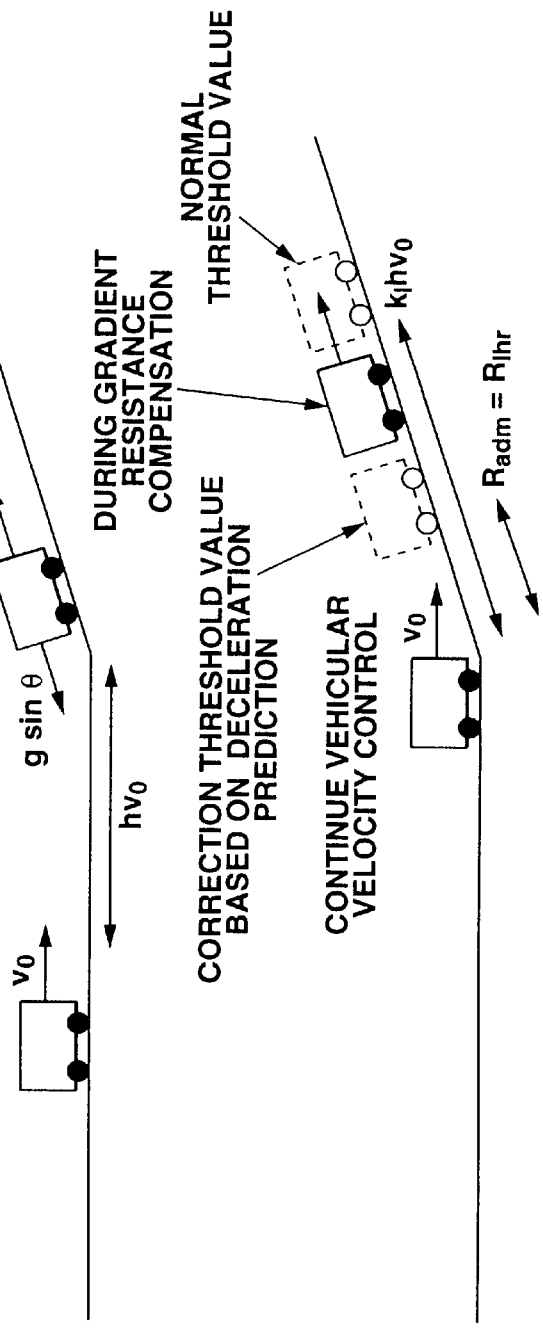
FIG.6A
FIG.6B
FIG.6C

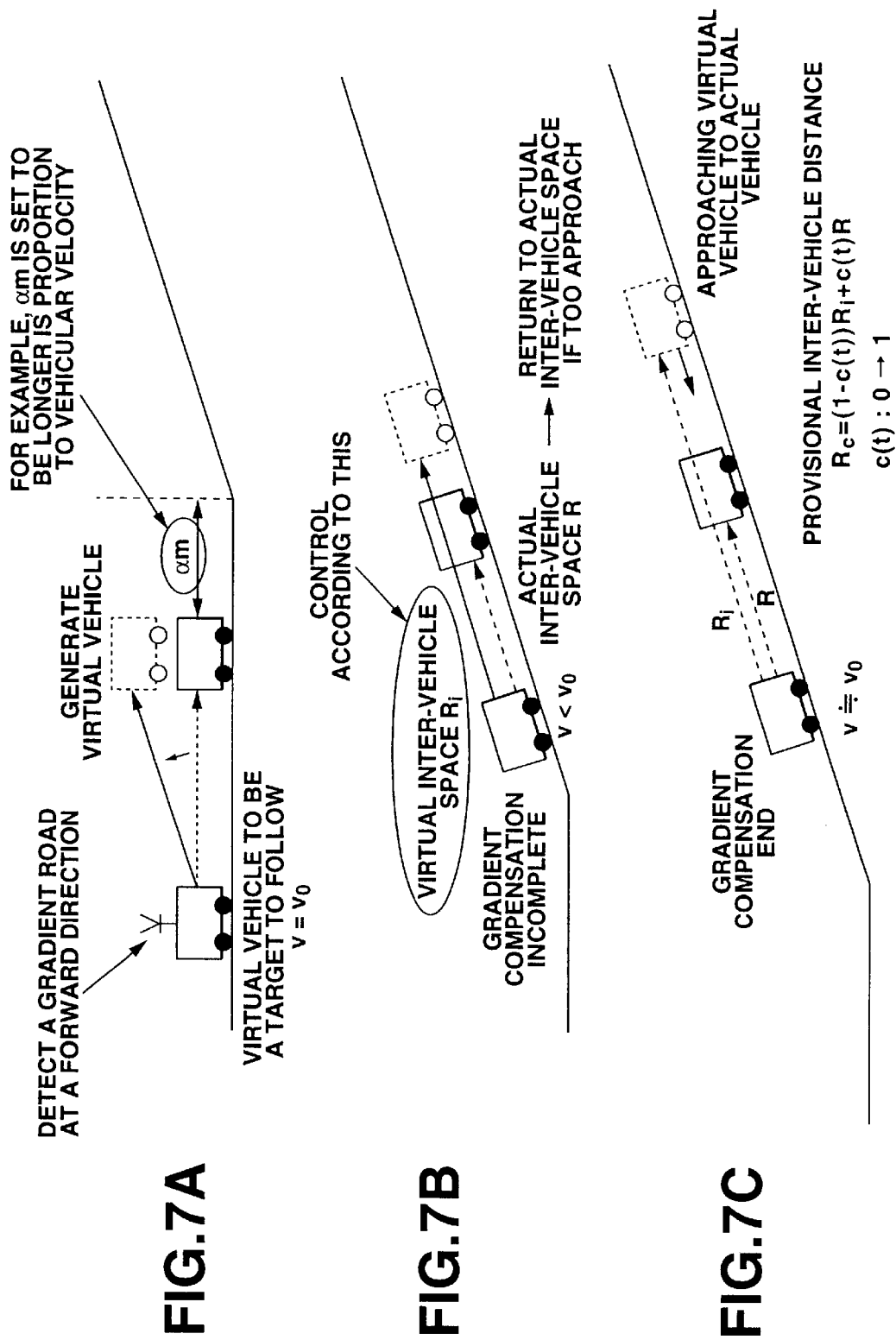

APPARATUS AND METHOD FOR CONTROLLING VEHICULAR VELOCITY OF HOST VEHICLE TO FOLLOW PRECEDING VEHICLE RUNNING AHEAD OF HOST VEHICLE

BACKGROUND OF THE INVENTION

1. Field of the Invention

The present invention relates to apparatus and method for controlling vehicular velocity of a host vehicle to follow a preceding vehicle which is running ahead of the vehicle (host vehicle), maintaining an inter-vehicle distance to the preceding vehicle substantially constant.

2. Description of the Related Art

A Japanese Patent Application First Publication No. Heisei 11-091 396 published on Apr. 6, 1999 exemplifies a previously proposed vehicular velocity controlling apparatus in which an acceleration/deceleration of the host vehicle is estimated in a case where the host vehicle is assumed to run on a flat (or horizontal) road according to an opening angle of an engine throttle valve, a shift position of a vehicular transmission, and a vehicular velocity during the vehicular run on a road segment having a gradient (or grade), a driven wheel velocity is differentiated to detect an actual acceleration/deceleration during the vehicular run on the road segment, a gradient resistance is estimated from the acceleration corresponding to a difference between the estimated acceleration and actual deceleration, and a vehicular driving force (braking force) is corrected on the basis of the estimated gradient resistance.

SUMMARY OF THE INVENTION

In a freeway, at a road segment on which a road gradient is largely varied, a vehicular velocity of each of the vehicles which are running on the road segment is varied so that a traffic density of the vehicle tends to become dense or thin and, thus, a traffic flow quantity is often reduced.

Such a road segment as described above is generally called a sag interval and a traffic congestion is frequently developed on the road segment.

On the other hand, a vehicle in which an automatic vehicular velocity control device (ASCD) to maintain the vehicular velocity constant is mounted becomes available on a market, it is expected that the vehicular velocity variation at the sag interval is suppressed to relieve the traffic congestion. However, as an actual practice, such an opportunity enabled to continue to run on the free way at a constant vehicular velocity is not so many and operation start and stop of the vehicular velocity control are repeated whenever the inter-vehicle distance to the preceding vehicle is adjusted. Therefore, an inter-vehicle distance controller (ACC: Adaptive Cruise Controller) to maintain the inter-vehicle distance to the preceding vehicle constant has been developed and has been put into practice on a market. However, since a control target is switched from the vehicular velocity control to the inter-vehicle distance control, the variation in the vehicular velocity becomes large with the influence of the gradient resistance received at the vehicular run on the sag interval. It is, therefore, necessary to compensate for the gradient resistance by some method in order to maintain such a preceding vehicle following characteristic as that of the vehicular run on the flat road even at the sag interval.

Although the previously proposed preceding vehicle following control apparatus described in the above-described Japanese Patent Application Publication has tried to solve such a problem as described above, the following inconveniences occur since the gradient resistance is compensated while the inter-vehicle distance control is continued.

That is to say, due to operational delays of the sensors and actuators, the previously proposed following control apparatus cannot obtain the estimated value of a correct gradient resistance at an inlet or outlet of the gradient road (ascending slope or descending slope) and the estimated value cannot immediately be reflected on the inter-vehicle distance control. Consequently, a large control error is temporarily developed.

For example, the vehicular velocity is temporarily decreased at a spot at which a road level is changed from the flat (horizontal) road segment to an ascending slope. When the plurality of vehicles are running in a file by means of the respective inter-vehicle distance controls, each inter-vehicle distance between the vehicles become narrowed due to a temporary deceleration of a most preceding vehicle and the following vehicles are accordingly decreased. Furthermore, further larger decelerations of the following vehicles occur due to the presence of the road gradient resistance. This phenomenon becomes more remarkable as an order of each of the following vehicle becomes trail. On the contrary, at a spot at which the road level is changed from the flat road segment to a descending slope, such a phenomenon as the large deceleration after the acceleration occurs as the order of the following vehicles becomes increased.

There is a possibility that the variation in the vehicular velocity in the inter-vehicle distance control not only gives an unpleasant feeling to vehicular occupant(s) but also induces a traffic congestion due to a development of a local roughness-and-fineness in a traffic flow density.

It is, hence, an object of the present invention to provide apparatus and method for controlling a vehicular velocity of a host vehicle to follow a preceding vehicle running ahead of the host vehicle which are capable of suppressing a vehicular velocity variation at a road segment on which the vehicle is to run and a road gradient is varied.

The above-described object can be achieved by providing an apparatus for controlling a vehicular velocity of a host vehicle to follow a preceding vehicle which is running ahead of the host vehicle, comprising: a vehicular velocity detecting section that detects the vehicular velocity of the host vehicle; an inter-vehicle distance detecting section that detects an inter-vehicle distance of the host vehicle to the preceding vehicle; gradient variation detecting section that detects a variation of a gradient of a road segment forward to the host vehicle on which the host vehicle is to run; control target switching section that switches a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting section; a target vehicular driving force calculating section that calculates a target value of a vehicular driving force to be exerted by the host vehicle to achieve a content of the control target; and vehicular driving force controlling section that controls the vehicular driving force on the basis of the calculated target value of the vehicular driving force of the host vehicle.

The above-described object can also be achieved by providing a method for controlling a vehicular velocity of a host vehicle to follow a preceding vehicle which is running ahead of the host vehicle, comprising: detecting the vehicular velocity of the host vehicle; detecting an inter-vehicle distance of the host vehicle to the preceding vehicle; detecting a variation of a gradient of a road segment forward to the host vehicle on which the host vehicle is to run; switching a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment; calculating a target value of a vehicular driving force to be exerted by the host vehicle to achieve a content of the control target; and controlling the vehicular driving force on the basis of the calculated target value of the vehicular driving force of the host vehicle.

This summary of the invention does not necessarily describe all necessary features so that the invention may also be a sub-combination of these described features.

BRIEF DESCRIPTION OF THE DRAWINGS

FIG. 5 is a graph representing an example of setting a target vehicular velocity of the host vehicle in the preferred embodiment shown in FIG. 1A.

FIGS. 6A, 6B, and 6C are explanatory views for explaining setting examples of allowable range on an inter-vehicle distance in a case where a road segment on which the host vehicle is to run is changed from a flat road (horizontal road) to gradient road.

FIGS. 7A, 7B, and 7C are explanatory views for explaining a switching method of switching a control rule from that of a vehicular velocity control to that of an inter-vehicle distance control.

DETAILED DESCRIPTION OF THE PREFERRED EMBODIMENT

Reference will hereinafter be made to the drawings in order to facilitate a better understanding of the present invention.

Figure 1A:
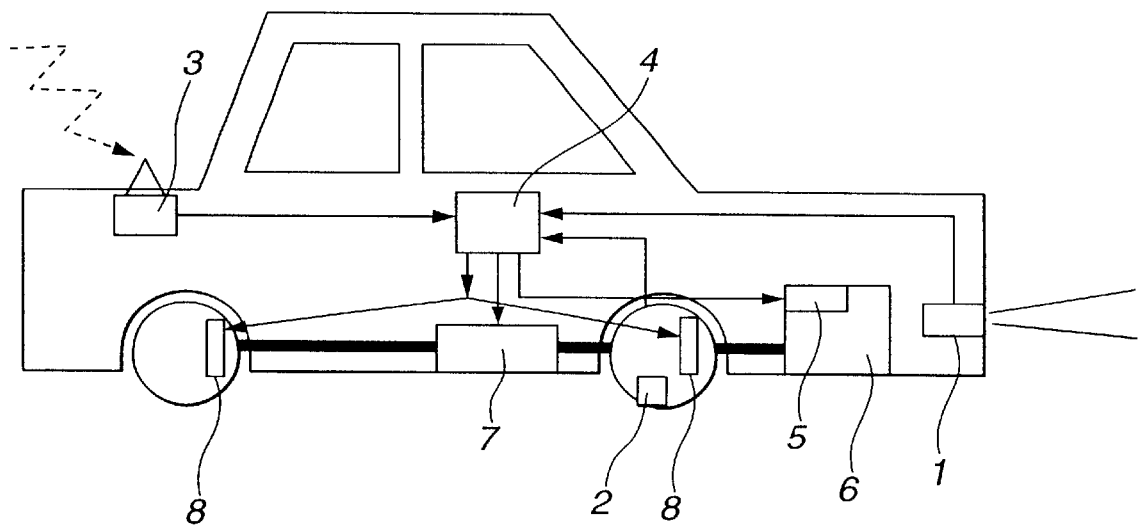
FIG. 1A is a rough configuration view of a host vehicle in which an apparatus for controlling a vehicular velocity of the host vehicle to follow a preceding vehicle in a preferred embodiment according to the present invention is applicable.

FIG. 1A shows a rough configuration view of a host vehicle in which an apparatus for controlling a vehicular velocity of the host vehicle to follow a preceding vehicle in a preferred embodiment according to the present invention is applicable.

Figure 2:
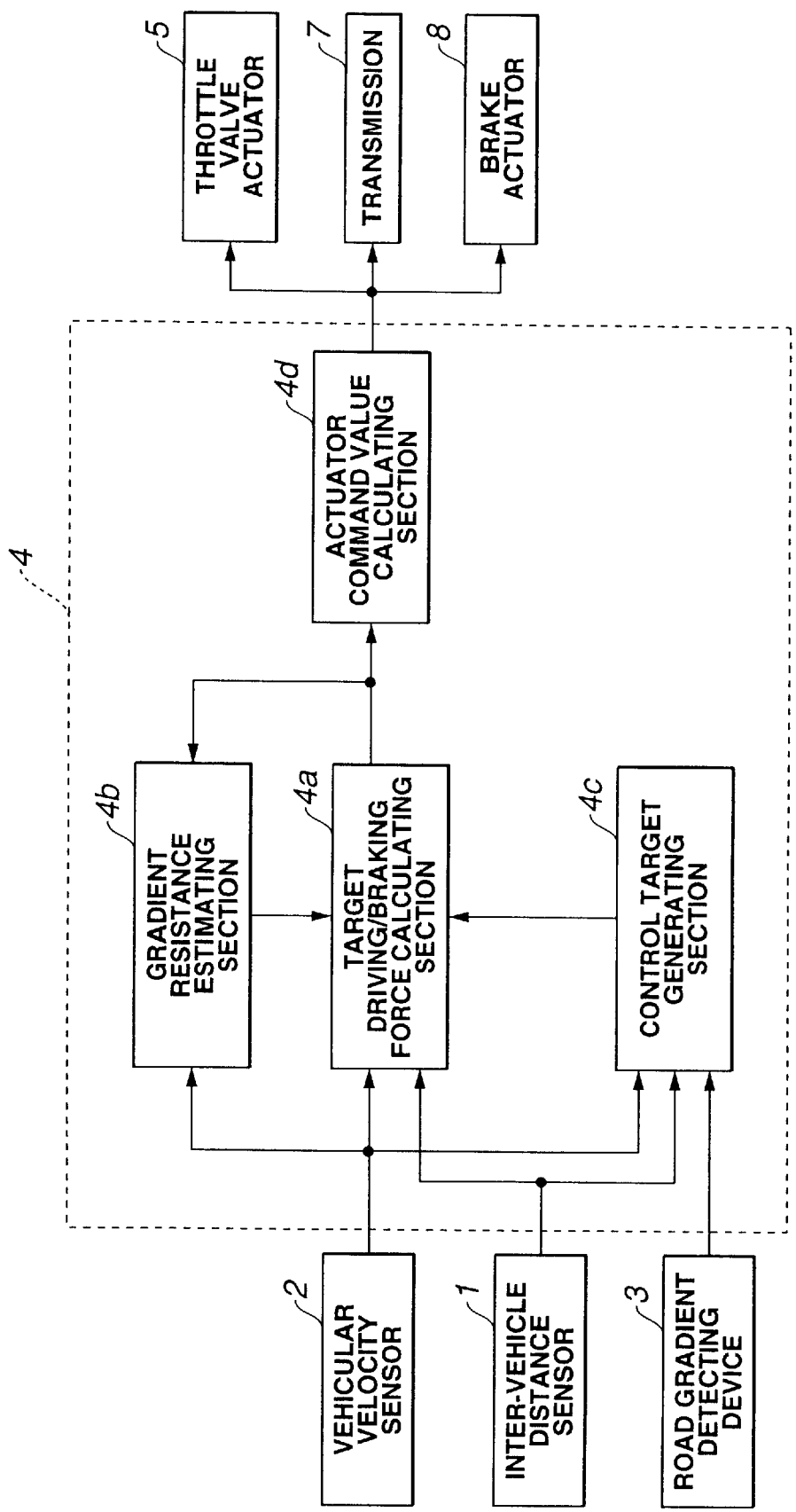
FIG. 2 is a functional block diagram of the preceding vehicle following controller shown in FIG. 1A.

FIG. 2 is a functional block diagram of a preceding vehicle following vehicular controller shown in FIG. 1A.

An inter-vehicle distance sensor 1 is attached on a front end of the vehicle (host vehicle) to radiate a radar wave toward a vehicular front detection zone to measure an inter-vehicle distance to a preceding vehicle. A laser radar or millimeter wave radar may be used for inter-vehicle distance sensor 1. A vehicular velocity sensor 2 includes a rotary encoder attached around a road wheel to measure a period of a pulse train signal generated in accordance with a rotation speed of the road wheel so as to detect the vehicular velocity.

A gradient road detector 3 detects a spot positioned at a vehicular forwarding direction and at which a road gradient is varied. For example, gradient road detector 3 includes a GPS (Global Positioning System) receiver and a road map data base to detect a present position of the vehicle and a running road thereof and to detect the above-described spot.

Figure 1B:
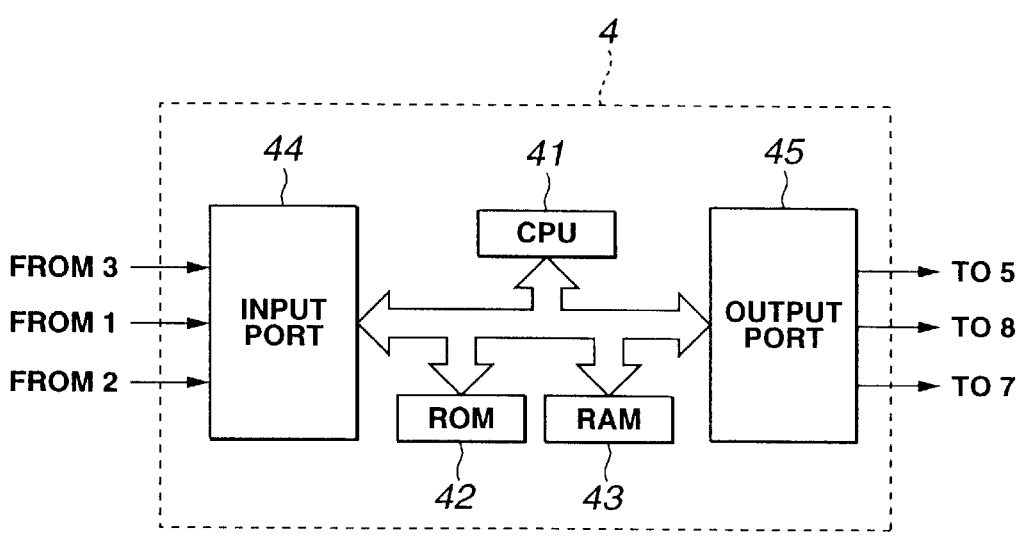
FIG. 1B is a schematic circuit block diagram of a preceding vehicle following controller shown in FIG. 1A.

A preceding vehicle following controller 4 includes: a microcomputer and its peripheral circuit. FIG. 1B shows a schematic circuit block diagram of preceding vehicle following controller 4. As shown in FIG. 1B, a preceding vehicle following controller 4 includes the microcomputer having a CPU (Central Processing Unit) 41, a ROM (Read Only Memory) 42, a RAM (Random Access Memory) 43, an Input Port 44, an Output Port 45, and a common bus. A throttle valve actuator 5, a transmission 7, and brake actuator 8 are controlled on the basis of the information from inter-vehicle distance sensor 1, vehicular velocity sensor 2, and gradient road detector 3. Preceding vehicle following controller 4 includes, in terms of a software, a target driving/braking force calculating section 4a; a gradient resistance estimating section 4b; a control target generating section 4c; and an actuator command value calculating section 4d. The details of each section will be described later.

A throttle valve actuator 5 adjusts an opening angle of a throttle valve of engine 6 in accordance with a throttle valve open command issued from preceding vehicle following controller 4 to control a vehicular driving force. A transmission 7 varies a transmission gear ratio in accordance with a gear ratio shift command from preceding vehicle following controller 4.

A brake actuator 8 adjusts a brake liquid pressure in accordance with a brake liquid pressure command signal from preceding vehicle following controller 4 to control a vehicular braking force applied to the vehicle. It is noted that, since the vehicular braking force correspond to a negative value of the same vehicular driving force, the vehicular driving force can include the vehicular driving force.

Figure 3:
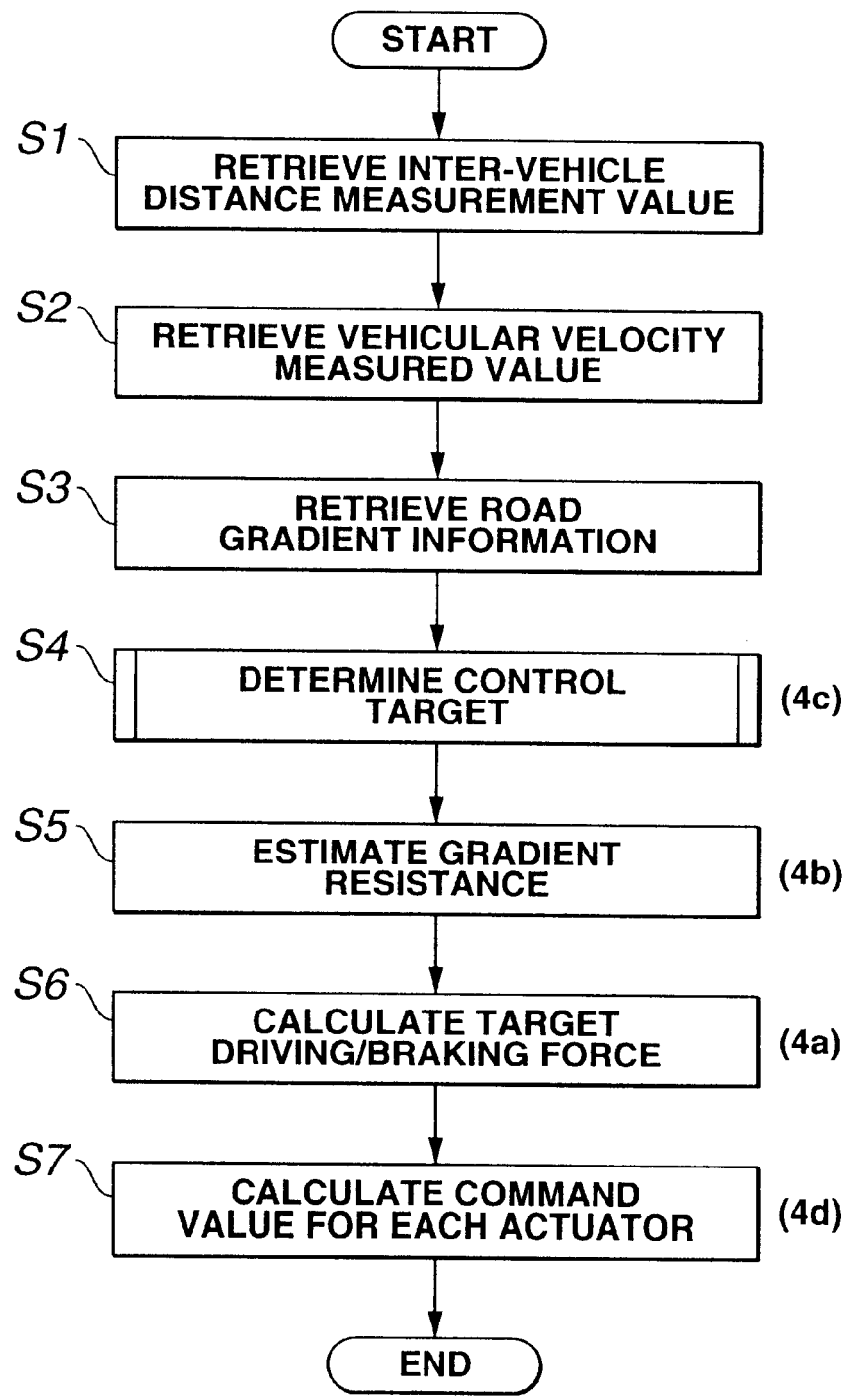
FIG. 3 is an operational flowchart for explaining an operation of the apparatus for controlling the vehicular velocity of the host vehicle to follow the preceding vehicle shown in FIG. 1A.

FIG. 3 shows an operational flowchart representing a preceding vehicle following control procedure.

An operation of the apparatus for controlling the vehicular velocity of the host vehicle to follow the preceding vehicle will be described with reference to a flowchart of FIG. 3.

Preceding vehicle following controller 4 (hereinafter, simply referred to controller 4) starts a control program based on the flowchart of FIG. 3 when a main switch (not shown) of controller 4 is turned on.

At a step S1, controller 4 fetches an inter-vehicle distance measured value from inter-vehicle distance sensor 1 into a memory (for example, RAM 43 shown in FIG. 1B) installed in controller 4.

At a step S 2, controller 4 fetches a measured value of the present vehicular velocity of the host vehicle from the vehicular velocity sensor 2.

At a step S3, controller 4 retrieves a road gradient information such as a gradient angle of a gradient road segment placed in front of the host vehicle and a distance of the host vehicle to a spot at which the gradient angle is changed from gradient road detecting device 3.

Figure 4:
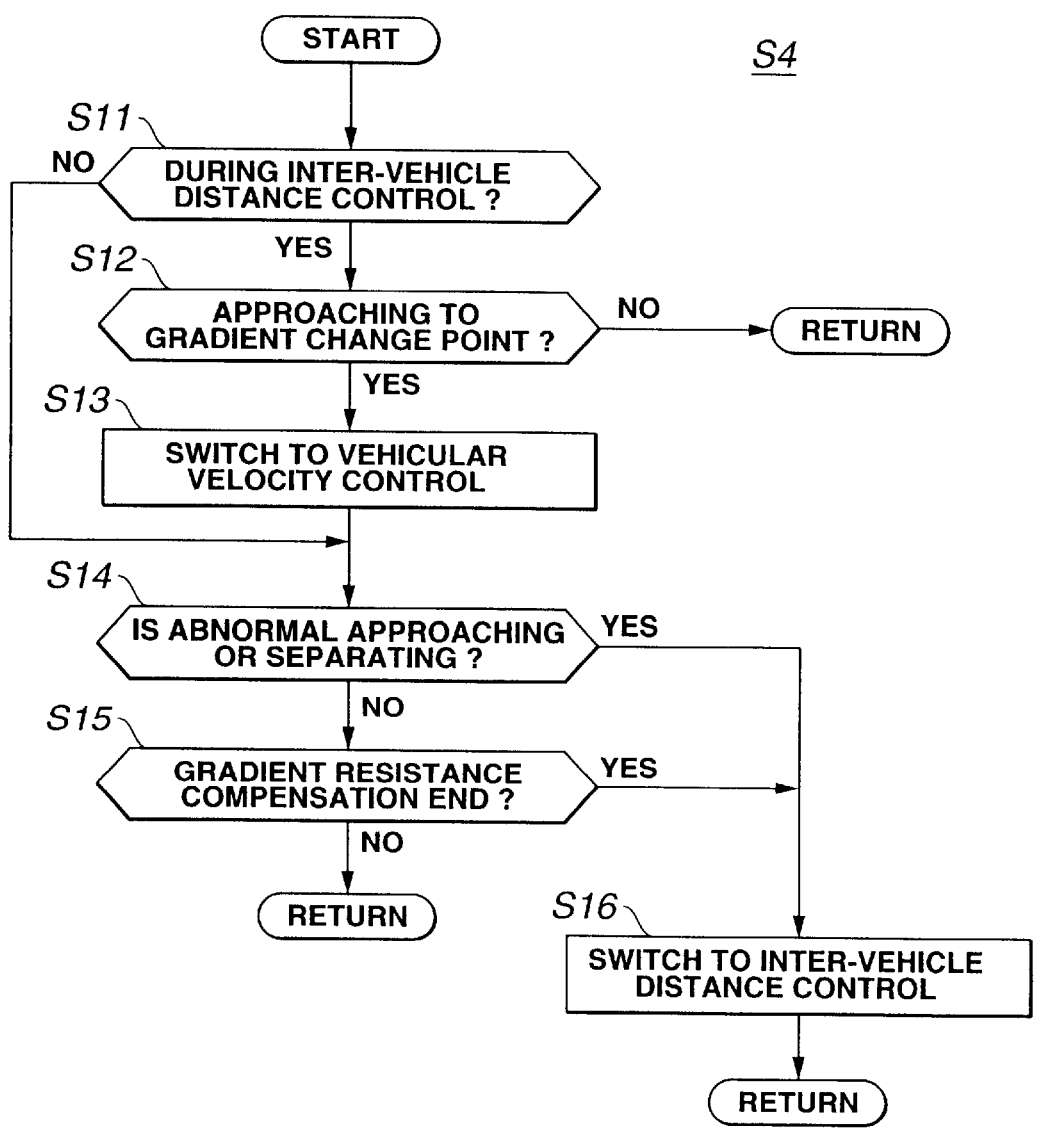
FIG. 4 is a detailed flowchart of a subroutine at a step S4 shown in FIG. 3.

At a step S4, controller 4 executes a control target determination routine (subroutine) shown in FIG. 4 to determine a control target that the host vehicle is to take on the basis of the inter-vehicle distance, the vehicular velocity, and the gradient road information, viz., a vehicular velocity control, an inter-vehicle distance control, or their intermediate states.

If the control target of a result of the determination is different from the present control target, the control target is switched so as to be reflected on the calculation of the target driving force (control target generating section 4c). A determination process of the control target will be described later.

At a step S5, controller 4 estimates a gradient resistance acted upon the host vehicle on the basis of target driving force calculated at a time of a previous execution of the control program based on FIG. 3, the vehicular velocity, and a vehicular running model (gradient estimating section 4b). A specific estimating method of the gradient resistance will be described later.

At the next step S6, controller 4 calculates target driving force on the basis of the inter-vehicle distance and vehicular velocity in accordance with a control rule corresponding to the control target of the result of determination at step S6 and corrects the target driving force according to the estimated gradient resistance (target driving force calculating section 4a). It is noted that the preferred embodiment has adopted a well-known control rule of the inter-vehicle distance control and a well-known control rule of the vehicular velocity and the detailed explanation of these control rules will herein be omitted.

At the next step S7, controller 4 calculates a throttle valve opening angle command value, a brake liquid pressure command value, and a transmission gear ratio shift command value to achieve target driving force and the bake actuator 8 (actuator command value calculating section 4d). It is noted that since the method of calculating the above-described command values adopts the well-known method, the explanation thereof will herein be omitted.

Next, the estimating method of gradient resistance will be described below. Suppose that the vehicular velocity of the host vehicle is v, the gradient resistance acted upon the host vehicle is f, the command value to actuator is $\mu$. A relationship from among vehicular velocity v, gradient resistance is f, and command value $\mu$ can be modeled as follows:

$$v = P_2(S) * (P_1(s) * \mu + f) \tag{1}$$

In the equation (1), P1 (s) denotes a transfer function representing a dynamics of an actuator and, for example, can be assumed to be the transfer function expressed as $$P_1(s) = 1/(\tau hd\ 1S+1) \tag{2},$$

(s denotes a Laplace transform operator).

In addition, $P_2(s)$ in the equation (2) denotes a transfer characteristic from a force acted upon the vehicle to the vehicular velocity of the host vehicle and, if a mass of the vehicle is M, $P_2(s)$ can be expressed as $$P_2(s) = 1/Ms \tag{3}.$$

Next, if the equation (1) is transformed, the gradient resistance f can be derived as:

$$f = P_2^{-1}(s)v - P_1(s)\mu \tag{4}.$$

Since $P_2^{-1}(s)$ is not proper, a filter H(s) strictly proper to 1 or more of a relative order is introduced to prepare the following signal for a correction value.

$$f = H(s)P_2^{-1}(s)*vH(s)P_1(s)*\mu \tag{5}.$$

If the command value of the actuator before the correction according to the gradient resistance is r and the command value $\mu$ after the correction is $$\mu(\mu = r\ f) \tag{6},$$

the relationship among vehicular velocity v, gradient resistance f, and command value $\mu$ is given as:

$$v = P_2(s)P_1(s)\gamma + P_2(s)*(1-H(s)P_1(s))f \tag{7}.$$

Suppose that the gradient resistance is changed in a stepwise manner. In order to eliminate progressively an influence of the gradient resistance, a zero point of the transfer function recited in a second term of a right side of equation (7) may be arranged on an origin. Filter H(s) to satisfy such a condition as described below is exemplified as $$H(s) = \{(2\zeta\omega+\tau\omega^2)s+\omega^2\}/(s^2+2\zeta\omega s+\omega^2) \tag{8}.$$

In equation (8), $\zeta$ and $\omega$ denotes positive constants.

Next, FIG. 4 shows an operational flowchart of control target determination process executed at step S4 shown in FIG. 3.

At a step S11, controller 4 confirms whether the inter-vehicle distance control is currently carried out.

Suppose now that the preceding vehicle is present on the road segment whose gradient is constant and controller 4 is performing such an inter-vehicle distance control that the inter-vehicle distance to the preceding vehicle is maintained constant. Then, the routine shown in FIG. 4 goes to a step S11 at which controller 4 confirms whether the inter-vehicle distance control is being executed. If Yes at step S11, the routine goes to a step S12 at which the distance from the preceding vehicle to the spot at which the gradient is changed is calculated on the basis of the road gradient information from the gradient road detecting device 3 and determines if the switch to the vehicular velocity control is carried out on the basis of the calculated distance. It is noted that the distance from the preceding vehicle to the spot is derived by subtracting the inter-vehicle distance from the distance from the host vehicle to the gradient changing (varying)) spot. The switching from the inter-vehicle distance control to the vehicular velocity control may be carried out at a time at which the distance from the preceding vehicle to the gradient changing spot has reached to a predetermined distance, for example, 50 meters. Or alternatively, this switching may be carried out at a predetermined time when the time duration for the preceding vehicle to be reached to the gradient changing spot becomes a predetermined interval of time, for example, 1.5 seconds. In the latter case, the distance to be switched to the vehicular velocity control is varied.

In this way, if the preceding vehicle has reached to a spot the predetermined distance ahead of the gradient changing spot or if the time duration for the preceding vehicle to be reached to the gradient changing spot indicates the predetermined time interval, the control target is switched from the inter-vehicle distance control to the vehicular velocity control. Hence, the vehicular velocity control to be switched to the vehicular velocity control before the preceding vehicle is accelerated or decelerated upon receipt of the gradient resistance. The influence of the vehicular velocity variation due to the gradient resistance of the preceding vehicle can completely be eliminated. If the preceding vehicle is not approaching to the gradient changing spot at step S12 (No), the inter-vehicle distance control is continued and is returned to step S5 in FIG. 3. On the other hand, if the preceding vehicle sufficiently approaches to the gradient variation spot, the routine goes to a step S13.

With target vehicular velocity set, the control target is switched from inter-vehicle distance control to vehicular velocity control at step S13. It is noted that the vehicular velocity of the host vehicle at the time of switching or that of the preceding vehicle may be the target vehicular velocity. In addition, as shown in FIG. 5, the target vehicular velocity may be set to a suitable median (intermediate value) from acceleration values of the host vehicle and preceding vehicle. In a case where the target vehicular velocity is set in accordance with the acceleration such a situation that the inter-vehicle distance therebetween becomes too narrow or becomes too wide during the vehicular velocity control due to an inappropriate vehicular velocity setting can be prevented.

In FIG. 5, if the acceleration of the preceding vehicle is positive and that of the host vehicle is negative, namely, when the preceding vehicle is being accelerated and the host vehicle is being decelerated, the vehicular velocity of the host vehicle V1 is set to the target vehicular velocity. On the contrary, when the acceleration of the host vehicle is positive and the acceleration of the preceding vehicle is negative, namely, when the preceding vehicle is decelerated and the host vehicle is accelerated, the vehicular velocity Vf of the preceding vehicle is set as the target vehicular velocity.

When the accelerations of the host vehicle and the preceding vehicle are substantially zero, namely, both of the host vehicle and the preceding vehicle are running at the same constant velocities, a median (intermediate value) (V1+Vf)/2 of the vehicular velocity V1 of the host vehicle and the vehicular velocity Vf of the preceding vehicle is set to the target vehicular velocity. If the acceleration of both of the host vehicle and the preceding vehicle are positive or negative, either a host vehicular side intermediate value (V1+2·Vf)/3 or preceding vehicle side intermediate value (2·V1+Vf)/3 is set to the target vehicular velocity.

In addition, in a case where the value of the gradient angle of the road gradient is known, the target vehicular velocity is corrected in accordance with the gradient angle so that a more appropriate vehicular velocity target value can be set.

For example, in the vehicular run on a gradient road such that the gradient angle is abruptly large (i.e., an ascending slope), a decrease in the vehicular velocity of the preceding vehicle becomes large. Furthermore, if the preceding vehicle is not run due to the vehicular velocity control and the inter-vehicle distance control, the preceding vehicle continues to run with its vehicular velocity reduced.

At this time, if the host vehicle sets the vehicular velocity of the preceding vehicle before the entrance into the ascending slope to the target vehicular velocity, the target vehicular velocity which is faster than the vehicular velocity of the preceding vehicle at which the preceding vehicle has entered the ascending slope. In this case, the inter-vehicle distance from the host vehicle to the preceding vehicle becomes excessively short. On the contrary, the inter-vehicle distance become wider than is necessary when the preceding vehicle is running on a descending slope such that the gradient angle becomes abruptly large. In either case, a disagreeable feeling (or unpleasant feeling) is given to the vehicular occupant (vehicular driver of the host vehicle) when the host vehicle is running on the gradient road having a large variation in the gradient angle. Therefore, if the host vehicle is running on the gradient road at which the variation in the gradient angle is large and the large vehicular velocity variation can be expected, the target vehicular velocity is set with the variation in the vehicular velocity taken into consideration. For example, at the spot at which the gradient angle is varied by 5% or wider, the target vehicular velocity is increased by 1 Km/h in a case of the ascending slope whenever the gradient angle is widened by 1% and increased by 1 Km/h in the case of the descending slope whenever the gradient angle is widened by 1% and decreased by 1 Km/h. Consequently, even in the case where the vehicle runs on the road gradient having the large variation in the gradient angle, such a variation in the inter-vehicle distance that the driver feels unpleasant can be avoided.

In a case where the switching of the control target from inter-vehicle distance to the vehicular velocity control is ended at step S13, the routine goes to a step S14 in which controller 4 monitors inter-vehicle distance to the preceding vehicle. If the inter-vehicle distance becomes too narrow to give the vehicular driver the disagreeable feeling (abnormal approaching) or too wide (abnormal separation) (Yes), the routine goes to a step S16.

At step S16, the control target is switched again to the inter-vehicle distance control to maintain an appropriate inter-vehicle distance. If the preceding vehicle does not run under the vehicular velocity control or the inter-vehicle distance control and if the driver of the host vehicle does not manually adjust the vehicular velocity or if the traffic congestion occurs in the vehicular forwarding direction, it is necessary to switch the control target from the vehicular velocity control to the inter-vehicle distance control. A switching condition from the vehicular velocity control to the inter-vehicle distance control is such that when the inter-vehicle distance or the inter-vehicle time duration (=inter-vehicle distance/vehicular velocity of either the preceding vehicle or the host vehicle) becomes in excess of an allowable range with respect to a preset inter-vehicle distance or a preset inter-vehicle time duration, the switch from the vehicular velocity control to the inter-vehicle distance control is carried out. For example, the control target is switched to inter-vehicle distance control when the inter-vehicle distance or the time duration becomes shorter than the preset inter-vehicle distance or time duration by 30% or more or becomes longer than the preset one by 50% or more.

In this way, if the inter-vehicle distance or time duration to the preceding vehicle during the vehicular velocity control has exceeded the allowable range with respect to the preset inter-vehicle distance or time duration, the control target is switched to the inter-vehicle distance. Consequently, even if the inter-vehicle distance or time duration is excessively expanded or constricted than would be expected after the preceding vehicle is accelerated or decelerated, the inter-vehicle distance or time duration can immediately be returned to the preset inter-vehicle distance or time duration. It is noted that it is necessary to avoid the switching from the vehicular velocity control to the inter-vehicle distance for a natural acceleration/deceleration of the preceding vehicle due to only the gradient resistance from easily being found. Hence, in a case where the gradient angle of the gradient road is known, the variation in the vehicular velocity of the preceding vehicle is predicted and the above-described allowable range to the preset inter-vehicle distance or time duration is corrected so that the easy switching from the vehicular velocity control to the inter-vehicle distance control cannot easily be carried out for the natural acceleration caused only by the gradient resistance of the preceding vehicle. Suppose now that the host vehicle is under the inter-vehicle distance control to follow the preceding vehicle running at a constant velocity at the inter-vehicle time duration h. If the gradient angle of the gradient road is θ, the host vehicle is switched to the vehicular velocity control and the preceding vehicle continues to run without adjustment of the vehicular velocity of the preceding vehicle. In this case, the variation in the inter-vehicle distance when the host vehicle is about to enter the gradient road can be estimated as $$\Delta R = \tfrac{1}{2} \cdot h^2 g \sin \theta \qquad (9).$$

In the equation (9), g denotes a gravitational acceleration.

An allowance of inter-vehicle distance variation with equation (9) as a measure may be considered to be set by assuming how fast a compensation of gradient resistance is started. Hereinbelow, an example of setting the allowance in the inter-vehicle distance in the case where the vehicular running road is changed from the flat (horizontal) road to the gradient road as shown in FIGS. 6A, 6B, and 6C. Suppose that a lower limit value of inter-vehicle distance allowable range before the correction, namely, a threshold value of the inter-vehicle distance to switch the control target from the vehicular velocity control to the inter-vehicle distance control at the time at which the inter-vehicle distance is shorter than this threshold value is set as k1 of the target inter-vehicle time duration ($k_1$ is a suitable constant so as to be indicated as $0<k_1<1$). The threshold value is $k1*h*v_0$ ($v_0$ denotes the target vehicular velocity). If a design parameter $k_2$ corresponding to an allowance degree for a compensation delay of the gradient resistance is introduced, the allowance inter-vehicle distance is set to $$Radm = hv_0 - \tfrac{1}{2}*(k_2 h)^2 g \sin \theta \qquad (10).$$

In the equation (10), $hv_0$ denotes the inter-vehicle distance before the preceding vehicle is entering at the gradient changing spot. If $k_2=1$, Radm is equal to the inter-vehicle distance when the host vehicle has reached to the gradient changing spot in a case where the preceding vehicle does not carry out the gradient compensation. If $k_2$ is made large, a large deceleration is allowed. If $k_2$ is made small, the control target is switched to inter-vehicle distance control unless the preceding vehicle more quickly compensates for the gradient resistance. If the threshold value before the correction is compared with a new allowance value of equation (10), a minimum value of the values so as to follow within the allowance range is set as a new threshold value. That is to say, a threshold value Rthr after the correction is defined as $$Rthr = \min\ (k_2 * hv_0, Radm) \qquad (11).$$

In this way, since the threshold value is corrected so as to allow more or less the compensation delay of the preceding vehicle, the unnecessary switching from the vehicular velocity control to the inter-vehicle distance control can be avoided. In the case where the road gradient is changed to the descending slope, the threshold value can be corrected in the same manner.

As described above, when the running road is the ascending slope, the allowable range of the inter-vehicle distance or the inter-vehicle time duration is expanded toward the shorter inter-vehicle distance according to the gradient angle and, when the running road is the descending slope, the allowable range is expanded toward the longer inter-vehicle distance according to the gradient angle. Hence, since a magnitude of the velocity variation of the preceding vehicle can be predicted using the gradient information, the unnecessary switching from the vehicular velocity control to the inter-vehicle distance control can be avoided.

Referring to FIG. 4, if there is no abnormal (excessive) approach nor excessive separation to and from the preceding vehicle (No) at step S14, the routine goes to a step S15 at which controller 4 determines whether the compensation of the gradient resistance for the host vehicle or the preceding vehicle has been completed. It is noted that the completion of the compensation of the gradient resistance therefore can be determined according to a vehicular velocity control error of the host vehicle. With a vehicular velocity accuracy of an automatic speed control device (ASCD) as a measure, an allowable control error is appropriately defined, for example, as 0.5 Km/h. In addition, the continuation time is defined from a performance of the gradient resistance estimator. A transfer function from the gradient resistance to the host vehicle is derived from equation (7) described above as:

$$P_2(s)(1 - H(s)P_1(s)) \qquad (12).$$

Since a step response of this transfer function should be converged to zero immediately after once risen since the zero point is arranged onto an origin. A time duration t0 for which the response is out of a range of control error is derived and a time duration ti for which the response falls within the control error range is derived. An appropriate value in a range of t0<t<ti is set as continuation time of the completion determination described above.

As described above, controller 4 determines that the compensation of the gradient resistance for the host vehicle has been completed when such a state that the vehicular velocity control error at the gradient road is equal to or below a predetermined value is continued for a predetermined time duration and, thereafter, the control target is switched from the vehicular velocity control to the inter-vehicle distance control. Hence, since the switching to the inter-vehicle distance control is carried out upon the completion of the compensation of the gradient resistance for the host vehicle, it becomes unnecessary to carry out simultaneously the compensations of the inter-vehicle distance and of the gradient resistance. Consequently, the acceleration/deceleration of the host vehicle can be suppressed at minimum.

On the other hand, the compensation of the gradient resistance for the preceding vehicle is determined according to the acceleration value of the preceding vehicle. The acceleration value of the preceding vehicle can approximately be estimated if a band pass filtering to the vehicular velocity of the preceding vehicle such as $$\omega^2 s/(s^2+2\zeta\omega s+\omega^2) \quad (13)$$

is carried out. The vehicular velocity of the preceding vehicle can be derived by adding the relative velocity of the host vehicle to the preceding vehicle to the vehicular velocity of the host vehicle. The relative velocity can directly be measured if the millimeter wave is used for the inter-vehicle distance sensor. However, its estimated value of the relative velocity can be derived by band pass filtering as shown in equation (13) to the inter-vehicle distance data. The allowance value of the acceleration is set to an appropriate value with a static value of a deceleration behavior of the driver and a performance of an acceleration estimation system taken into consideration, for example, +0.05 G through −0.05 G. The continuation time may be set to the same value as set for the determination of the completion of the gradient resistance for the vehicular velocity of the host vehicle.

As described above, controller 4 estimates the acceleration value of the preceding vehicle, determines that the compensation of the gradient resistance for the preceding vehicle has been completed when the state in which the estimated value of the acceleration of the preceding vehicle falls in the allowable range of, for example, +0.05 G through −0.05 G is continued for the predetermined time duration, and switches of the control target to the inter-vehicle distance control. Hence, since the switching to the inter-vehicle distance control is carried out after the completion of the compensation of the gradient resistance for the preceding vehicle, an influence of the vehicular velocity variation of the preceding vehicle becomes less so that the acceleration/deceleration of the host vehicle can be suppressed at minimum.

If the completion of the gradient resistance is determined at step S15 in FIG. 4 (Yes), the routine goes to step S16. If No at step S15, the routine returns to step S5 in FIG. 3. At step S16, the control target is switched from the vehicular velocity control to the inter-vehicle distance control. Immediately after the switching determination to the inter-vehicle distance control, a method of switching to a control rule in the inter-vehicle distance control may be considered. However, it is not preferable that there is a possibility of generating an abrupt acceleration/deceleration in a case where a gap between the control rules of the vehicular velocity control and the inter-vehicle distance control is present. To avoid this possibility, a transient state to continuously link the two control rules is set to achieve a smooth switching therebetween.

A first method of linking the two control rules is a method of taking a linear coupling between both control rules with the two control rules independently calculated. Suppose that a control input corresponding to the vehicular velocity control is $\mu_v$ and a control input corresponding to the inter-vehicle distance is $\mu_d$. In addition, suppose an appropriate time function c(t) which is monotonously increased from 0 to 1. For example, $$c(t) = \begin{cases} 0 & t < 0 \\ \gamma t & 0 \le t < 1/\gamma \\ 1 & t \ge 1/\gamma \end{cases} \quad (14)$$

In equation (14), γ denotes an appropriate positive constant. A transient control input μtmp is developed as follow $$\mu tmp = c(t)\mu d + (1-c(t))\mu v \quad (15).$$

Then, μtmp is determined as a command value for the actuator. Then, even if the gap between control inputs $\mu_v$ and $\mu_d$ of the vehicular velocity and inter-vehicle distance controls is present, the smooth link between $\mu_v$ and $\mu_d$ can be achieved if γ is appropriately selected.

Therefore, when the control target is switched from the vehicular velocity control to the inter-vehicle distance control, a weighted mean between the control input $\mu_v$ (target driving force) to achieve the vehicular velocity control and that $\mu_d$ (target driving force) to achieve the inter-vehicle distance control is carried out to calculate the actuator command value (target driving force), a weight value to the control input $\mu_v$ of the vehicular velocity control is continuously varied from 1 to 0, and the weight value to the control input $\mu_d$ of the inter-vehicle distance control is continuously varied from 0 to 1. Hence, the target driving forces between the vehicular velocity control and inter-vehicle distance control can continuously be switched and the abrupt development of the driving force and braking force during the switching of the control target can be prevented.

A second method is a method in which a virtual vehicle is generated and the inter-vehicle distance control to the virtual vehicle is continued. The second method will be described with reference to FIGS. 7A, 7B, and 7C.

In the second method, the virtual vehicle which continues to run at the target vehicular velocity when the control target is switched to the vehicular velocity control is generated at the same position and, thereafter, the inter-vehicle distance control is carried out with respect to the virtual vehicle to achieve the vehicular velocity control. According to the second method, with the inter-vehicle distance control rule maintained, an equivalent vehicular velocity control can be achieved only by replacing the measured inter-vehicle distance value with a calculated value of the inter-vehicle distance to the virtual vehicle (a value which is an addition of an integrated value of the vehicular velocity error to an initial inter-vehicle distance). When the control is to be switched from the vehicular velocity control to the inter-vehicle distance control, the virtual vehicle may be moved so as to make the virtual vehicle coincident with the actual preceding vehicle. If the inter-vehicle distance to the virtual vehicle which continues to run at a constant velocity is Ri and the actual inter-vehicle distance measured value is R, the following provisional inter-vehicle distance measure value Rc is calculated using the same time function as equation (14) as follows:

$$Rc = (1-c(t))Ri + c(t)R \quad (16).$$

The inter-vehicle distance control is carried out using the provisional inter-vehicle distance measured value Rc until c(t) gives 1. That is to say, if the inter-vehicle distance control is carried out to make the provisional inter-vehicle distance measured value Rc equal to the target inter-vehicle distance, the provisional inter-vehicle distance measured value Rc is made coincident with the actual inter-vehicle distance measured value R after the predetermined time duration 1/γ has passed so that the vehicular velocity control can be switched to the normal (ordinary) inter-vehicle distance control.

As described above, when the control target is switched from the inter-vehicle distance control to the vehicular velocity control, the virtual vehicle which continues to run at the target vehicular velocity is generated in a pseudo manner at the same position as the preceding vehicle and the vehicular velocity control is achieved by carrying out the inter-vehicle distance control for the virtual vehicle.

Furthermore, when the control target is switched from the vehicular velocity control to the inter-vehicle distance control, the weighted mean of the inter-vehicle distance to the virtual vehicle and of the actual inter-vehicle distance measured value is carried out to calculate the provisional inter-vehicle distance measured value, the weight value to the inter-vehicle distance to the virtual vehicle is continuously varied from 1 to 0, and the weight value to the actual inter-vehicle distance measured value is continuously varied from 0 to 1. Thus, when the control target is switched between the vehicular velocity control and the inter-vehicle distance control, the abrupt driving force and braking force can be prevented from occurring. Since a control algorithm with the inter-vehicle distance control can directly be utilized, a software configuration of a control system can be simplified.

Figure 8:
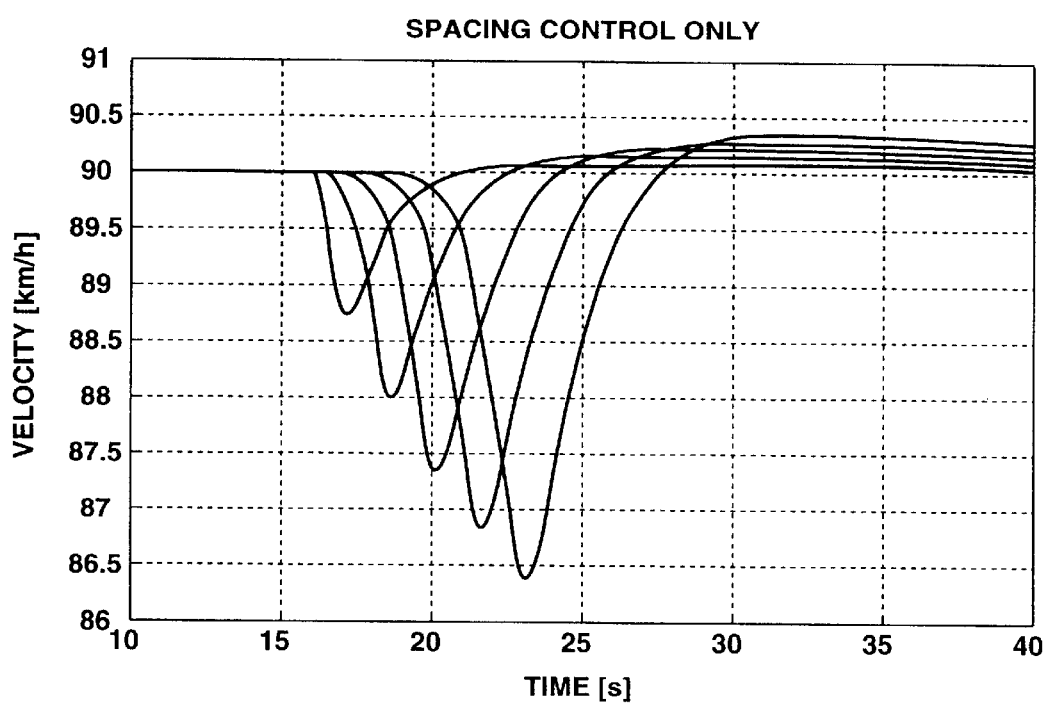
FIG. 8 is a characteristic graph representing a simulation result of vehicular velocity variations of respective five vehicles when the respective five vehicles ran under only the inter-vehicle distance control and a vehicle group of the five vehicles has entered on an ascending slope.
Figure 9:
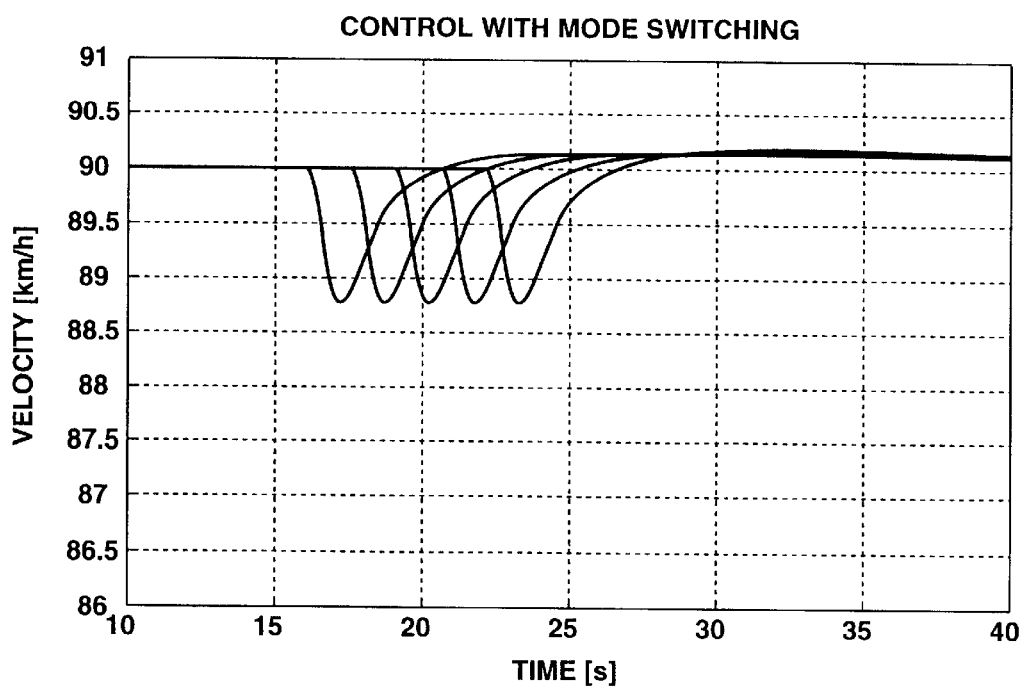
FIG. 9 is a characteristic graph representing a simulation result of the vehicular velocity variations of the five vehicles when the vehicle group of the five vehicles ran using a switching method between the vehicular velocity control and the inter-vehicle distance control described in the preferred embodiment shown in FIG. 1.

FIGS. 8 and 9 show results of simulations on the vehicular velocity variations of five vehicles when a vehicle group of the five vehicles entered the same ascending slope. FIG. 8 shows the result of the simulation when the five vehicles were only under the inter-vehicle distance control. It is noted that SPACING CONTROL ONLY described in FIG. 8 means that each of the five vehicles is only under the inter-vehicle distance control. FIG. 9 shows the result of the simulation when the five vehicles ran on the same ascending slope using the method of switching the control target between the inter-vehicle distance control and the vehicular velocity control described in the preferred embodiment. It is noted that CONTROL WITH MODE SWITCHING described in FIG. 9 means that the control target switching between the vehicular velocity control and the inter-vehicle distance control is carried out as described in the preferred embodiment.

In FIGS. 8 and 9, a lateral axis denotes a time in a unit of second [sec] and a longitudinal axis denotes a travel velocity [km/h] of each of the five vehicles. As appreciated from FIGS. 8 and 9, the large deceleration occurred as the order of the five vehicles becomes last. In the case of the switching of the control target (FIG. 9), any vehicle substantially provides the same deceleration pattern and could achieve a smoother vehicular behavior with a less unpleasant feeling given to each vehicular driver.

According to the preferred embodiment described above, such a phenomenon that the vehicular velocity variation of the most preceding vehicle is amplified and propagated to the following vehicles can be prevented.

Consequently, a traffic congestion generation at the sag interval and the unpleasant feeling given to the vehicular occupant in the case of only the inter-vehicle distance control can be reduced.

The entire contents of a Japanese Patent Application No. 2000-335653 (filed in Japan on Nov. 2, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An apparatus for controlling a vehicular velocity of a host vehicle to follow a preceding vehicle which is running ahead of the host vehicle, comprising:

a vehicular velocity detecting section that detects the vehicular velocity of the host vehicle;

an inter-vehicle distance detecting section that detects an inter-vehicle distance of the host vehicle to the preceding vehicle;

a gradient variation detecting section that detects a variation of a gradient of a road segment forward to the host vehicle on which the host vehicle is to run;

a control target switching section that switches a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting section;

a target vehicular driving force calculating section that calculates a target value of a vehicular driving force to be exerted by the host vehicle to achieve the control target; and a vehicular driving force controlling section that controls the vehicular driving force on the basis of the calculated target value of the vehicular driving force of the host vehicle.

2. An apparatus for controlling a vehicular velocity of a host vehicle to follow a preceding vehicle which is running ahead of the host vehicle as claimed in claim 1, further comprising a target vehicular velocity setting section that sets the target value of the vehicular velocity of the host vehicle during the vehicular velocity control to any one of the detected value of the vehicular velocity of the host vehicle, a vehicular velocity of the preceding vehicle, and an intermediate value between the vehicular velocities of the host vehicle and the preceding vehicle according to vehicular velocity variation rates of both of the host vehicle and the preceding vehicle when the control target switching section switches from the inter-vehicle distance control to the vehicular velocity control.

3. An apparatus for controlling a vehicular velocity of a host vehicle to follow a preceding vehicle which is running ahead of the host vehicle as claimed in claim 1, wherein the control target switching section switches the control target from the vehicular velocity control to the inter-vehicle distance control when a state in which a vehicular velocity control error over the road segment of which the gradient is varied is equal to or lower than a predetermined value is continued for a predetermined duration of time.

4. An apparatus for controlling a vehicular velocity of a host vehicle to follow a preceding vehicle which is running ahead of the host vehicle as claimed in claim 3, further comprising an acceleration estimating section that estimates an acceleration of the preceding vehicle and wherein the control target switching section switches the control target from the vehicular velocity control to the inter-vehicle distance control when a state in which an estimated value of the acceleration of the preceding vehicle falls within a predetermined range is continued for a duration of time equal to or longer than a predetermined duration of time.

5. An apparatus for controlling a vehicular velocity of a host vehicle to follow a preceding vehicle which is running ahead of the host vehicle as claimed in claim 1, wherein the control target is switched from the vehicular velocity control to the inter-vehicle distance control when the inter-vehicle distance to the preceding vehicle falls out of an allowable range with respect to a preset inter-vehicle distance during the vehicular velocity control.

6. An apparatus for controlling a vehicular velocity of a host vehicle to follow a preceding vehicle which is running ahead of the host vehicle as claimed in claim 5, wherein, when the road segment is an ascending slope, the allowable range is expanded toward a shorter inter-vehicle distance according to a gradient angle of the ascending slope with respect to a horizontal plane and, when the road segment is a descending slope, the allowable range is expanded toward a longer inter-vehicle distance according to the gradient angle of the descending slope with respect to the horizontal plane.

7. An apparatus for controlling a vehicular velocity of a host vehicle to follow a preceding vehicle which is running ahead of the host vehicle as claimed in claim 1, wherein, when the control target switching section switches the control target from the vehicular velocity control to the inter-vehicle distance control, the target driving force calculating section carries out a weighted mean between the target driving forces to achieve the vehicular velocity control and the inter-vehicle distance control to calculate the target value of the vehicular driving force, continuously varies a weight value to the target driving force to achieve the vehicular velocity control, and continuously varies another weight value to the target driving force to achieve the inter-vehicle distance control from 0 to 1.

8. An apparatus for controlling a vehicular velocity of a host vehicle to follow a preceding vehicle which is running ahead of the host vehicle as claimed in claim 1, wherein, when the control target is switched from the inter-vehicle distance control to the vehicular velocity control, a virtual vehicle which continues to run at the target value of the vehicular velocity of the host vehicle is generated at the same position as the preceding vehicle and the inter-vehicle distance control with respect to the virtual vehicle is carried out to achieve the inter-vehicle distance control.

9. An apparatus for controlling a vehicular velocity of a host vehicle to follow a preceding vehicle which is running ahead of the host vehicle as claimed in claim 8, wherein, when the control target switching section switches the control target from the vehicular velocity control to the inter-vehicle distance control, the target driving force calculating section carries out a weighted mean between the inter-vehicle distance to the virtual vehicle and the actual inter-vehicle distance to the preceding vehicle to calculate a provisional inter-vehicle distance measured value, continuously varies a weight value for the inter-vehicle distance to the virtual vehicle from 1 to 0, and continuously varies another weight value for the actual inter-vehicle distance from 0 to 1.

10. An apparatus for controlling a vehicular velocity of a host vehicle to follow a preceding vehicle which is running ahead of the host vehicle, comprising:

a vehicular velocity detecting section that detects the vehicular velocity of the host vehicle;

an inter-vehicle distance detecting section that detects an inter-vehicle distance of the host vehicle to the preceding vehicle;

a gradient variation detecting section that detects a variation of a gradient of a road segment forward to the host vehicle on which the host vehicle is to run;

a control target switching section that switches a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting section;

a target vehicular driving force calculating section that calculates a target value of a vehicular driving force to be exerted by the host vehicle to achieve the control target; and a vehicular driving force controlling section that controls the vehicular driving force on the basis of the calculated target value of the vehicular driving force of the host vehicle, wherein the control target switching section switches the control target from the inter-vehicle distance control to the vehicular velocity control when the preceding vehicle has reached a spot which is a predetermined distance ahead of another spot at which the gradient of the road segment is varied.

11. An apparatus for controlling a vehicular velocity of a host vehicle to follow a preceding vehicle which is running ahead of the host vehicle, comprising:

a vehicular velocity detecting section that detects the vehicular velocity of the host vehicle;

an inter-vehicle distance detecting section that detects an inter-vehicle distance of the host vehicle to the preceding vehicle;

a gradient variation detecting section that detects a variation of a gradient of a road segment forward to the host vehicle on which the host vehicle is to run;

a control target switching section that switches a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting section;

a target vehicular driving force calculating section that calculates a target value of a vehicular driving force to be exerted by the host vehicle to achieve the control target;

a target vehicular velocity setting section that sets the target value of the vehicular velocity of the host vehicle during the vehicular velocity control to any one of the detected value of the vehicular velocity of the host vehicle, a vehicular velocity of the preceding vehicle, and an intermediate value between the vehicular velocities of the host vehicle and the preceding vehicle according to vehicular velocity variation rates of both of the host vehicle and the preceding vehicle when the control target switching section switches from the inter-vehicle distance control to the vehicular velocity control; and a vehicular driving force controlling section that controls the vehicular driving force on the basis of the calculated target value of the vehicular driving force of the host vehicle, wherein the target vehicular velocity setting section sets the target value of the vehicular velocity of the host vehicle in such a manner that, when the road segment is an ascending slope, the target value of the vehicular velocity of the host vehicle is reduced and, when the road segment is a descending slope, the target value of the vehicular velocity of the host vehicle is increased.

12. A method for controlling a vehicular velocity of a host vehicle to follow a preceding vehicle which is running ahead of the host vehicle, comprising:

detecting the vehicular velocity of the host vehicle;

detecting an inter-vehicle distance of the host vehicle to the preceding vehicle;

detecting a variation of a gradient of a road segment forward to the host vehicle on which the host vehicle is to run;

switching a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment;

calculating a target value of a vehicular driving force to be exerted by the host vehicle to achieve the control target; and controlling the vehicular driving force on the basis of the calculated target value of the vehicular driving force of the host vehicle.

13. A method for controlling a vehicular velocity of a host vehicle to follow a preceding vehicle which is running ahead of the host vehicle as claimed in claim 12, wherein, when the control target is switched from the inter-vehicle distance control to the vehicular velocity control, the target value of the vehicular velocity of the host vehicle is set to any one of the detected value of the vehicular velocity of the host vehicle, a vehicular velocity of the preceding vehicle, and an intermediate value between the vehicular velocities of the host vehicle and the preceding vehicle according to vehicular velocity variation rates of both of the host vehicle and the preceding vehicle.

14. A method for controlling a vehicular velocity of a host vehicle to follow a preceding vehicle which is running ahead of the host vehicle as claimed in claim 13, wherein, when the road segment is an ascending slope, the target value of the vehicular velocity of the host vehicle is reduced and, when the road segment is a descending slope, the target value of the vehicular velocity of the host vehicle is increased.

15. A method for controlling a vehicular velocity of a host vehicle to follow a preceding vehicle which is running ahead of the host vehicle as claimed in claim 12, wherein the control target is switched from the vehicular velocity control to the inter-vehicle distance control when a state in which a vehicular velocity control error over the road segment of which the gradient is varied is equal to or lower than a predetermined value is continued for a predetermined duration of time.

16. A method for controlling a vehicular velocity of a host vehicle to follow a preceding vehicle which is running ahead of the host vehicle as claimed in claim 15, further comprising estimating an acceleration of the preceding vehicle and wherein the control target is switched from the vehicular velocity control to the inter-vehicle distance control when a state in which an estimated value of the acceleration of the preceding vehicle falls within a predetermined range is continued for a duration of time equal to or longer than a predetermined duration of time.

17. A method for controlling a vehicular velocity of a host vehicle to follow a preceding vehicle which is running ahead of the host vehicle as claimed in claim 12, wherein the control target is switched from the vehicular velocity control to the inter-vehicle distance control when the inter-vehicle distance to the preceding vehicle-falls out of an allowable range with respect to a preset inter-vehicle distance during the vehicular velocity control.

18. A method for controlling a vehicular velocity of a host vehicle to follow a preceding vehicle which is running ahead of the host vehicle as claimed in claim 17, wherein, when the road segment is an ascending slope, the allowable range is expanded toward a shorter inter-vehicle distance according to a gradient angle of the ascending slope with respect to a horizontal plane and, when the road segment is a descending slope, the allowable range is expanded toward a longer inter-vehicle distance according to the gradient angle of the descending slope with respect to the horizontal plane.

19. A method for controlling a vehicular velocity of a host vehicle to follow a preceding vehicle which is running ahead of the host vehicle, comprising:

detecting the vehicular velocity of the host vehicle;

detecting an inter-vehicle distance of the host vehicle to the preceding vehicle;

detecting a variation of a gradient of a road segment forward to the host vehicle on which the host vehicle is to run;

switching a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment;

calculating a target value of a vehicular driving force to be exerted by the host vehicle to achieve the control target; and controlling the vehicular driving force on the basis of the calculated target value of the vehicular driving force of the host vehicle, wherein the control target is switched from the inter-vehicle distance control to the vehicular velocity control when the preceding vehicle has reached a spot which is a predetermined distance ahead of another spot at which the gradient of the road segment is varied.

20. An apparatus for controlling a vehicular velocity of a host vehicle to follow a preceding vehicle which is running ahead of the host vehicle, comprising:

vehicular velocity detecting means for detecting the vehicular velocity of the host vehicle;

inter-vehicle distance detecting means for detecting an inter-vehicle distance of the host vehicle to the preceding vehicle;

gradient variation detecting means for detecting a variation of a gradient of a road segment forward to the host vehicle on which the host vehicle is to run;

control target switching means for switching a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting means;

target vehicular driving force calculating means for calculating a target value of a vehicular driving force to be exerted by the host vehicle to achieve a content of the control target; and vehicular driving force controlling means for controlling the vehicular driving force on the basis of the calculated target value of the vehicular driving force of the host vehicle.

21. An apparatus for controlling a vehicular velocity of a host vehicle to follow a preceding vehicle which is running ahead of the host vehicle, comprising:

vehicular velocity detecting means for detecting the vehicular velocity of the host vehicle;

inter-vehicle distance detecting means for detecting an inter-vehicle distance of the host vehicle to the preceding vehicle;

gradient variation detecting means for detecting a variation of a gradient of a road segment forward to the host vehicle on which the host vehicle is to run;

control target switching means for switching a control target between an inter-vehicle distance control in which the vehicular velocity of the host vehicle is controlled to make a detected value of the inter-vehicle distance substantially equal to a target value of the inter-vehicle distance and a vehicular velocity control in which the vehicular velocity of the host vehicle is controlled to make a detected value of the vehicular velocity of the host vehicle substantially equal to a target value of the vehicular velocity of the host vehicle according to a result of detection of the variation of the gradient of the road segment by the gradient variation detecting means;

target vehicular driving force calculating means for calculating a target value of a vehicular driving force to be exerted by the host vehicle to achieve the control target; and vehicular driving force controlling means for controlling the vehicular driving force on the basis of the calculated target value of the vehicular driving force of the host vehicle, wherein the control target switching means switches the control target from the inter-vehicle distance control to the vehicular velocity control when the preceding vehicle has reached a spot which is a predetermined distance ahead of another spot at which the gradient of the road segment is varied.

22. A cruise control device for a vehicle, comprising:

a controller configured to adjust a velocity of a host vehicle at least based on a road gradient of a road segment preceding the vehicle, the controller switching between at least an inter-vehicle distance control mode and a vehicle velocity control mode, wherein a target velocity is reduced when the road gradient has an ascending gradient, and wherein the target velocity is increased when the road gradient has a descending gradient.

23. A cruise control device for a vehicle, comprising:

a controller configured to adjust a velocity of a host vehicle at least based on a road gradient of a road segment preceding the vehicle, the controller switching between at least an inter-vehicle distance control mode and a vehicle velocity control mode, wherein the controller switches from the vehicle velocity control mode to the inter-vehicle distance control mode at least when a vehicular velocity error over the road segment is equal to or lower than a predetermined value for a predetermined amount of time.

* * * * *